(12) United States Patent
Hwang et al.

(10) Patent No.: US 11,524,564 B2
(45) Date of Patent: Dec. 13, 2022

(54) POWER TRANSMISSION SYSTEM OF HYBRID ELECTRIC VEHICLE

(71) Applicants: Hyundai Motor Company, Seoul (KR); Kia Corporation, Seoul (KR)

(72) Inventors: Seong Wook Hwang, Gunpo-Si (KR); Tae Whan Kim, Yongin-Si (KR); Youngbae Ryu, Seongnam-Si (KR); Jong Hyo Park, Ansan-Si (KR); Hyung-Min Kim, Suwon-Si (KR); Juhyeon Park, Hwaseong-Si (KR); Yongdal Choi, Suwon-Si (KR); Jaewook Lee, Seongnam-Si (KR); Wonmin Cho, Hwaseong-Si (KR)

(73) Assignees: Hyunda Motor Company, Seoul (KR); Kia Corporation, Seoul (KR)

( * ) Notice: Subject to any disclaimer, the term of this patent is extended or adjusted under 35 U.S.C. 154(b) by 2 days.

(21) Appl. No.: 17/401,008

(22) Filed: Aug. 12, 2021

(65) Prior Publication Data
US 2022/0194204 A1    Jun. 23, 2022

(30) Foreign Application Priority Data
Dec. 21, 2020  (KR) .................... 10-2020-0179852

(51) Int. Cl.
*B60K 6/365*      (2007.10)
*F16H 3/72*       (2006.01)
(Continued)

(52) U.S. Cl.
CPC ............... *B60K 6/365* (2013.01); *B60K 6/44* (2013.01); *B60K 6/543* (2013.01);
(Continued)

(58) Field of Classification Search
CPC ...... F16H 3/724–727; F16H 2200/2005–2028; F16H 2200/2038;
(Continued)

(56) References Cited

U.S. PATENT DOCUMENTS

| | | | |
|---|---|---|---|
| 2010/0160108 A1* | 6/2010 | Si ......................... | B60K 6/365 903/911 |
| 2012/0052999 A1* | 3/2012 | Kim ...................... | B60K 6/547 180/65.22 |

(Continued)

*Primary Examiner* — Ernesto A Suarez
*Assistant Examiner* — Lillian T Nguyen
(74) *Attorney, Agent, or Firm* — Morgan, Lewis & Bockius LLP

(57) ABSTRACT

A power transmission apparatus for a hybrid vehicle of which a second motor shaft gear of a second motor-generator is disposed on one side of a second motor shaft disposed in parallel with the first motor shaft, includes a planetary gear set disposed on the first motor shaft and including one rotation element and the other rotation element are fixedly connected to the engine output shaft and the first motor shaft, respectively, and one remaining rotation element is engaged to the other rotation element, and the planetary gear set in which a drive gear is connected to the remaining rotation element through a one-way clutch, and an output shaft disposed in parallel between the engine output shaft and the second motor shaft, externally gear-engaged with each of the drive gear and the second motor shaft gear through a driven gear fixedly connected to one side.

12 Claims, 6 Drawing Sheets

(51) Int. Cl.
*B60K 6/44* (2007.10)
*B60K 6/543* (2007.10)

(52) U.S. Cl.
CPC .......... *B60Y 2200/92* (2013.01); *F16H 3/727* (2013.01); *F16H 2200/2005* (2013.01); *F16H 2200/2035* (2013.01); *F16H 2200/2066* (2013.01); *F16H 2200/2082* (2013.01)

(58) Field of Classification Search
CPC .............. B60K 6/00–543; B60K 6/547; B60K 2200/2066–2092
See application file for complete search history.

(56) References Cited

U.S. PATENT DOCUMENTS

2014/0162824 A1\* 6/2014 Choi ...................... B60K 6/387
 475/5
2016/0368361 A1\* 12/2016 Endo .......................... F16H 1/46
2017/0305255 A1\* 10/2017 Kim ........................ F16H 3/728

\* cited by examiner

FIG. 2

| Mode | | Driving element | OWC | B1 | B2 | Remark |
|---|---|---|---|---|---|---|
| EV | | MG2 | - | - | - | |
| HEV | SERIES | MG2 | - | - | ● | Engine power driving MG1 power generation |
| | E-CVT | Engine, (MG2) | ● | - | - | Part of Engine power driving MG1 power generation |
| | PARALLEL | Engine, (MG2) | ● | ● | - | MG2 driving for torque assist |

POWER TRANSMISSION SYSTEM OF HYBRID ELECTRIC VEHICLE

CROSS-REFERENCE TO RELATED APPLICATION

The present application claims priority to Korean Patent Application No. 10-2020-0179852 filed on Dec. 21, 2020, the entire contents of which is incorporated herein for all purposes by this reference.

BACKGROUND OF THE INVENTION

Field of the Invention

The present invention relates to a power transmission apparatus for a hybrid vehicle. More particularly, the present invention relates to a power transmission apparatus for a hybrid vehicle that improves fuel efficiency by enabling increased speed operation by driving an engine in a high-speed operation area.

Description of Related Art

Vehicle environment-friendly technology is a key technology for the survival of the vehicle industry in the future, and advanced vehicle makers are focusing on developing environment-friendly vehicles to achieve environmental and fuel efficiency regulations.

Accordingly, vehicle makers are developing EV (Electric Vehicle), HEV (Hybrid Electric Vehicle), and FCEV (Fuel Cell Electric Vehicle) as future vehicle technologies.

Since the above-described future vehicle has various technical limitations such as weight and cost, vehicle makers are paying attention to hybrid electric vehicles as an alternative to practical problems for satisfying exhaust gas regulations and improving fuel efficiency performance. To do so, it is competing fiercely in the development of power transmission apparatus.

The power transmission apparatus of a hybrid vehicle can combine power in several ways by use of two or more power sources. As a power source, a gasoline engine or diesel engine that uses fossil fuel and a motor-generator driven by electrical energy are mixed and used.

The power transmission apparatus of this hybrid vehicle may be implemented in EV mode driven only by motor-generator, HEV mode by simultaneous driving of engine and motor-generator, and engine mode driven only by engine according to the combination of engine and motor-generator.

In addition, when the vehicle is stopped, the engine is stopped (Idle Stop & Go), when the vehicle is braking, the motor-generator is driven using the vehicle's kinetic energy instead of the conventional frictional braking. The electrical energy generated at this time may be saved in a battery and then re-used when driving a vehicle, reducing fuel use by applying technologies such as regenerative braking, significantly improving fuel efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus configured for a hybrid vehicle that improves fuel efficiency by enabling increased speed operation by driving an engine in a high-speed operation area.

In addition, in various exemplary embodiments of the present invention, a power transmission apparatus of a hybrid vehicle configured for reducing the overall length by disposing a one-way clutch that transmits unidirectional torque of the ring gear to the drive gear on the external circumference side of the planetary gear set is provided.

A power transmission apparatus of a hybrid vehicle that outputs by shifting torque of an engine and first and second motor-generators according to one or a plurality of exemplary embodiment of the present invention, wherein an engine output shaft to which the engine's torque is input and a first motor shaft of the first motor-generator are disposed on the same axis, and a second motor shaft gear of the second motor-generator is disposed on one side of a second motor shaft disposed in parallel with the first motor shaft, and wherein power transmission apparatus may include a planetary gear set disposed on the first motor shaft and including three rotation elements, and among the three rotation elements, one rotation element and the other rotation element are fixedly connected to the engine output shaft and the first motor shaft, respectively, and one remaining rotation element is engaged to the other rotation element, and the planetary gear set in which a drive gear is connected to the remaining rotation element through a one-way clutch, and an output shaft disposed in parallel between the engine output shaft and the second motor shaft, externally gear-engaged with each of the drive gear and the second motor shaft gear through a driven gear fixedly connected to one side, and the output shaft outputting the rotational power transmitted from the planetary gear set and the second motor-generator to a differential engaged to the planetary gear set.

The planetary gear set may be a single pinion planetary gear set, and the single planetary gear set may include a sun gear fixedly connected to the first motor shaft, a planet carrier fixedly connected to the engine output shaft, and a ring gear engaged to the driving gear through the one-way clutch.

The power transmission apparatus according to various exemplary embodiments of the present invention may further include a first brake and a second brake, and the sun gear may be selectively connectable to a transmission housing by the first brake, and the ring gear may be selectively connectable to the transmission housing by the second brake.

The ring gear may transmit unidirectional torque to the drive gear through the one-way clutch.

The output shaft may be externally gear-meshed with a final reduction gear of the differential through an output gear fixedly connected to one side thereof.

A power transmission apparatus of a hybrid vehicle according to various exemplary embodiments of the present invention may include an engine output shaft through which engine torque is input, a first motor-generator including a first motor shaft disposed on the same axis as the engine output shaft, a planetary gear set disposed on the first motor shaft and including three rotation elements, and among the three rotation elements, one rotation element and the other rotation element are fixedly connected to the engine output shaft and the first motor shaft, respectively, a second motor-generator including a second motor shaft disposed in parallel with the first motor shaft, an output shaft disposed in parallel between the engine output shaft and the second motor shaft, and transmitting torque transmitted from the other rotation element among the three rotation elements of the planetary gear set and the second motor shaft to a differential, a drive gear connected to the other rotation element of the planetary gear set via a one-way clutch, a second motor shaft gear fixedly connected to the second motor shaft, and a driven gear fixedly connected to the output shaft and externally gear-meshed with the drive gear and the second motor shaft gear.

The power transmission apparatus of a hybrid vehicle according to various exemplary embodiments of the present invention has an effect of improving fuel efficiency by facilitating increased speed operation by driving an engine in a high-speed or medium-speed driving range.

In addition, the overall length may be reduced by dispose of the one-way clutch for transmitting one direction torque of the ring gear to the external circumference side of the planetary gear set, improving the installability.

In addition to HEV SERIES mode, in HEV E-CVT mode, power generation driving is possible by inputting a part of the torque of the engine to the first motor-generator, increasing the energy regeneration efficiency.

In addition, the torque assist of the second motor-generator in HEV PARALLEL mode has an effect of sufficiently securing the driving torque on the slope.

In addition, the effect obtained or predicted by an exemplary embodiment of the present invention will be disclosed directly or implicitly in the detailed description of an exemplary embodiment of the present invention. That is, various effects predicted according to various exemplary embodiments of the present invention will be disclosed within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of a power transmission apparatus of a hybrid vehicle according to various exemplary embodiments of the present invention.

Figure 1:
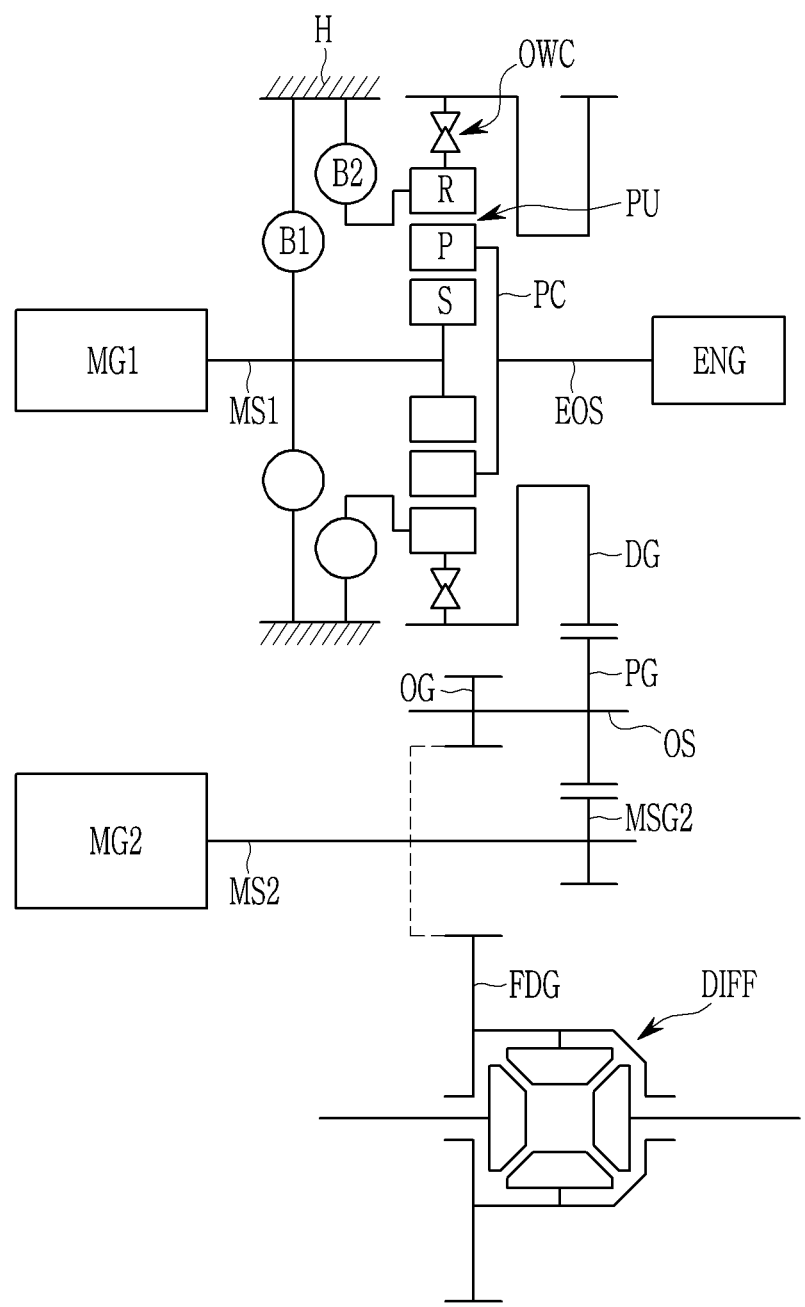
FIG. 1 is a schematic diagram of a power transmission apparatus of a hybrid vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and the same or similar constituent elements are described by applying the same reference numeral throughout the specification.

In the following description, dividing names of components into first, second, and the like is to divide the names because the names of the components are the same as each other, and an order thereof is not particularly limited.

FIG. 1 is a schematic diagram of a power transmission apparatus of a hybrid vehicle according to various exemplary embodiments of the present invention.

Referring to FIG. 1, a power transmission apparatus of a hybrid vehicle according to various exemplary embodiments of the present invention may include an engine ENG, first and second motor-generators MG1, and MG2, a planetary gear set PU that diverges torque of engine ENG and torque of first motor-generator MG1, and an output shaft OS that transmits torque from the planetary gear set PU and the second motor-generator MG2 to a differential DIFF.

The engine ENG is a power source, and various known engines such as gasoline engines or diesel engines using conventional fossil fuels may be used.

The first and second motor-generators MG1 and MG2 perform motor and generator functions as known, each including a stator fixed to a transmission housing and a rotor rotatably supported inside the radial direction of the stator.

The planetary gear set PG may be a single pinion planetary gear set, and the planetary gear set PG includes a sun gear S, a planet carrier PC that supports rotation of a plurality of pinion gear P externally gear-meshed with the sun gear S and a ring gear R that is engaged internally with a plurality of pinion gear P and is power connected to sun gear S.

The torque of the engine ENG is input to the engine output shaft EOS, and the engine output shaft EOS is disposed on the same axis as the first motor shaft MS1 of the first motor-generator MG1.

A second motor shaft MS2 of the second motor-generator MG2 is disposed in parallel with the first motor shaft MS1 of the first motor-generator MG1, and a second motor shaft gear MSG2 is provided on one side thereof.

The planetary gear set PU is disposed on the first motor shaft MS1.

That is, in the planetary gear set PU, the sun gear S is fixedly connected to the first motor shaft MS1, the first brake B1 is interposed, and the sun gear S is selectively connectable to the transmission housing H, so that it is operated as a selective fixed element.

In addition, the planet carrier PC is fixedly connected to the engine output shaft EOS, and the torque of the engine ENG is input thereto.

In addition, the ring gear R interposes the one-way clutch OWC to be connected to the drive gear DG, and simultaneously interposes the second brake B2 to be selectively connectable to the transmission housing H to operate as a selective fixed element.

Here, the one-way clutch OWC is disposed on the external circumference side of the ring gear R and transmits only one direction torque of the ring gear R to the drive gear DG.

That is, the planetary gear set PU increases or decreases the torque input to the sun gear S and the planet carrier PC according to the difference in rotation speed and outputs it to the ring gear R.

The output shaft OS is disposed in parallel between the engine output shaft EOS and the second motor shaft MS2, and on one side of the output shaft OS, an output gear OG externally gear-meshed the final reduction gear FDG of the differential DIFF 15 fixedly connected.

In addition, a driven gear PG is fixedly connected to the output shaft OS on the other side, and the driven gear PG is externally gear-engaged with the drive gear DG and the second motor shaft gear MSG2, respectively.

That is, the output shaft OS outputs the torque transmitted from the planetary gear set PU and the second motor-generator MG2 through the driven gear PG to the differential DIFF through the output gear OG.

The gear ratio for each gear formed by the drive gear DG, the driven gear PG, and the second motor shaft gear MSG2 as described above may be set according to the design condition of the transmission.

The first, second brakes B1, and B2 are hydraulic pressure friction coupling units operated by hydraulic pressure supplied from the hydraulic pressure control apparatus, and mainly wet multi-plate hydraulic pressure friction coupling units may be used, but is not limited thereto.

FIG. 2 is an operation chart of a power transmission apparatus of a hybrid vehicle according to various exemplary embodiments of the present invention, and FIG. 3, FIG. 4, FIG. 5 and FIG. 6 is a power flowchart for each shifting mode of a power transmission apparatus of a hybrid vehicle according to various exemplary embodiments of the present invention.

Referring to FIG. 2 and FIG. 3 to FIG. 6, the vehicle may be driven in four operation modes depending on the driving conditions of the engine ENG and the first and second motor-generators MG1, and MG2 and the operation conditions of the first brake and the second brake B1 and B2, and a more detailed description is as follows.

[EV Mode]

Figure 3:
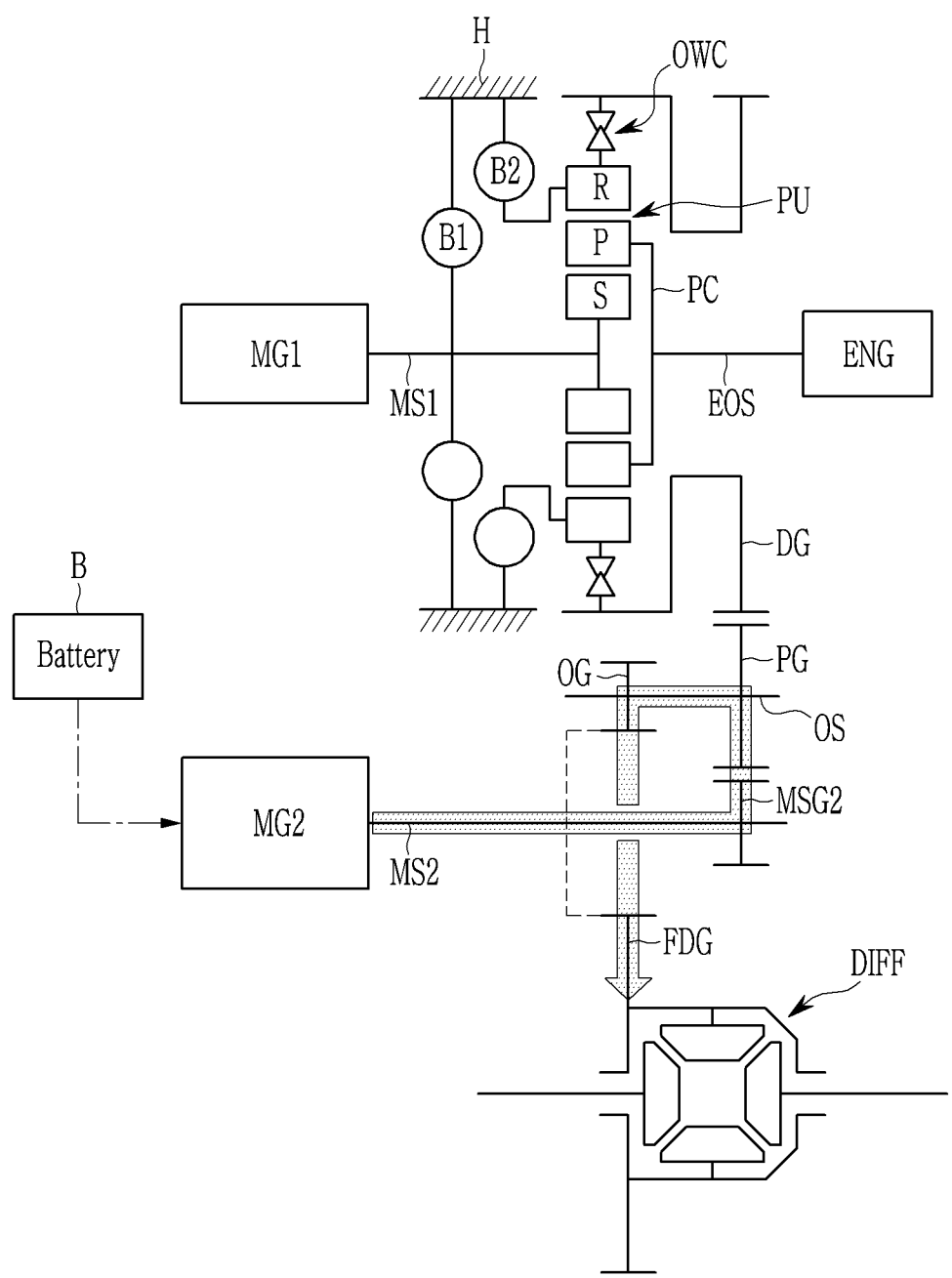
FIG. 3, FIG. 4, FIG. 5 and FIG. 6 are power flowcharts for each shifting mode of a power transmission apparatus of a hybrid vehicle according to various exemplary embodiments of the present invention.

Referring to FIG. 2 and FIG. 3, in the EV mode, while the first brake and the second brake B1 and B2 are not operated, the engine ENG is stopped and the second motor-generator MG2 is driven.

Accordingly, the second motor-generator MG2 is driven using electrical energy of a battery B, and the torque of the second motor-generator MG2 is transferred to the differential DIFF thorough the second motor shaft MS2, the second motor shaft gear MSG2, the driven gear PG, the output shaft OS, the output gear OG, and the final reduction gear FDG to achieve EV mode.

It is desirable to operate the EV mode driving in a low-speed driving range of 30 kph or less.

In addition, if the second motor-generator MG2 is driven in reverse rotation under the above conditions, reverse driving is possible.

[HEV SERIES Mode]

Figure 4:
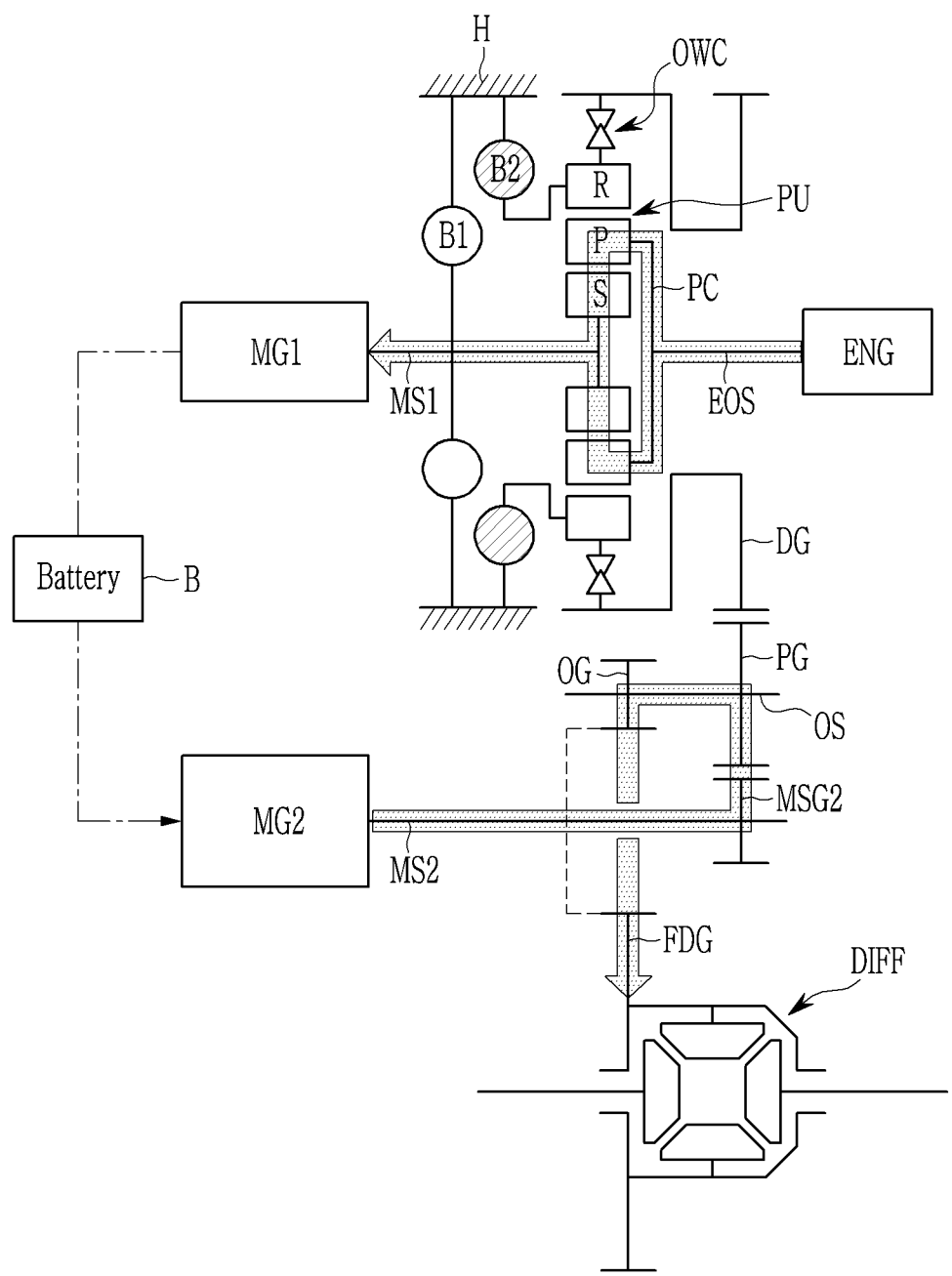

Referring to FIG. 2 and FIG. 4, in HEV SERIES mode, the second brake B2 operates, and the engine ENG, the first and second motor-generators MG1 and MG2 are all driven.

Accordingly, in the planetary gear set PU, the ring gear R operates as a fixed element, and the torque of the engine ENG is input to the planet carrier PC of the planetary gear set PU through the engine output shaft EOS, and is input to the first motor shaft MS1 of the first motor-generator MG1 through the sun gear S with the speed increased.

Accordingly, the first motor-generator MG1 charges the battery B by generating power by the entire torque of the engine ENG, and the second motor-generator MG2 is driven by use of the electrical energy of the charged battery B.

In other words, the torque of the second motor-generator MG2 is transmitted to the differential DIFF through the second motor shaft MS2, the second motor shaft gear MSG2, the driven gear PG, the output shaft OS, the output gear OG, and the final reduction gear FDG while driving in HEV SERIES mode.

[HEV E-CVT Mode]

Figure 5:
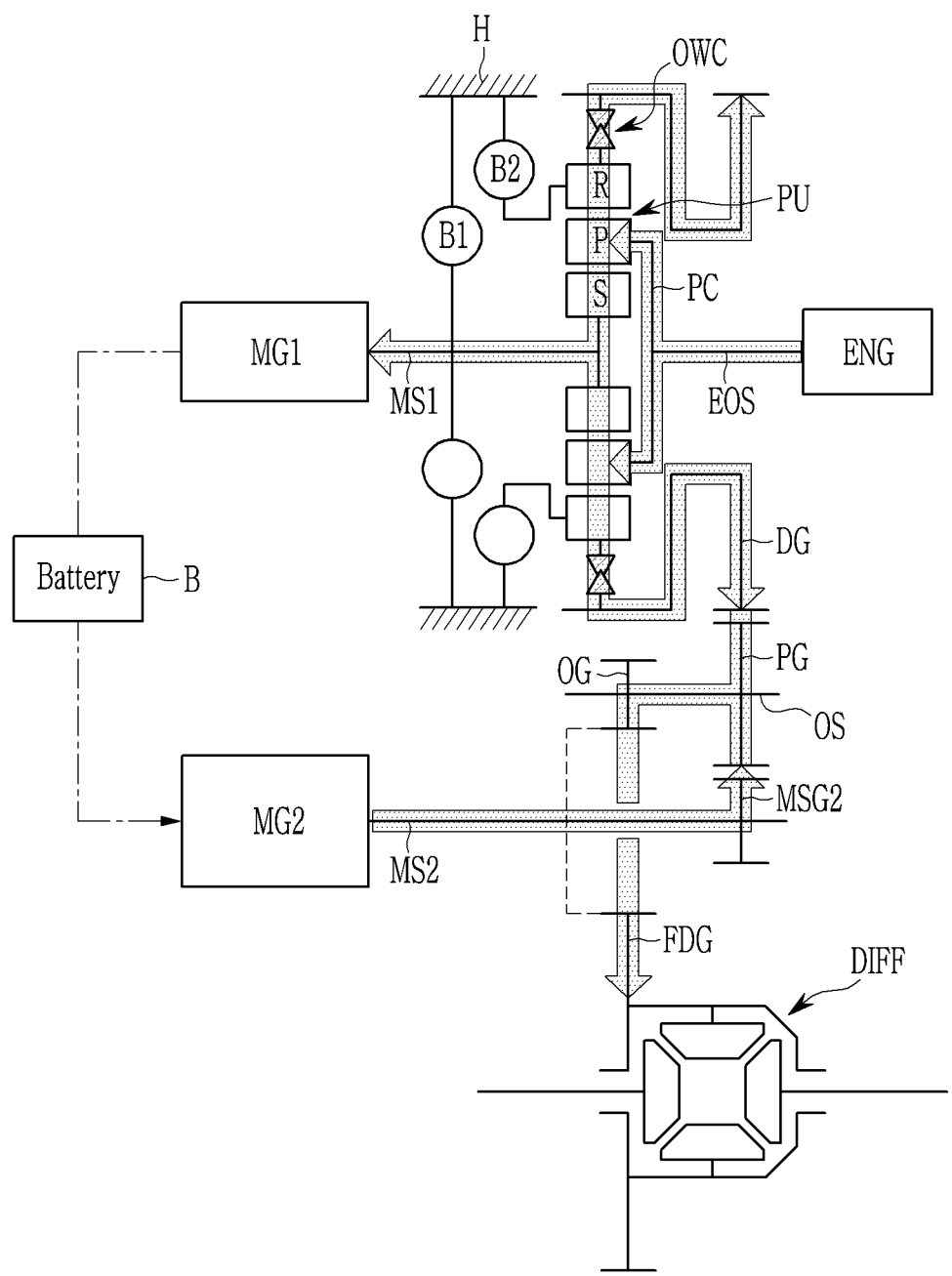

Referring to FIG. 2 and FIG. 5, in HEV E-CVT mode, the one-way clutch OWC operates, and the engine ENG and the second motor-generator MG2 are driven.

Accordingly, the torque of the engine ENG may be input to the planet carrier PC of the planetary gear set PU through the engine output shaft EOS, and portion of the torque of the engine ENG may be input to the first motor shaft MS1 of the first motor-generator MG1 through the sun gear S, and the torque of the remaining engine ENG is output through the drive gear DG connected to the ring gear R of the planetary gear set PU by the one-way clutch OWC.

Accordingly, the first motor-generator MG1 may be powered and driven by some torque of the engine ENG to charge the battery B.

And the torque of engine ENG output to drive gear DG is merged from driven gear PG together with torque of the second motor-generator MG2 and transmitted to the differential DIFF through the output shaft OS, the output gear OG, and the final reduction gear FDG, and thus the REV E-CVT mode driving is performed.

[HEV PARALLEL Mode]

Figure 6:
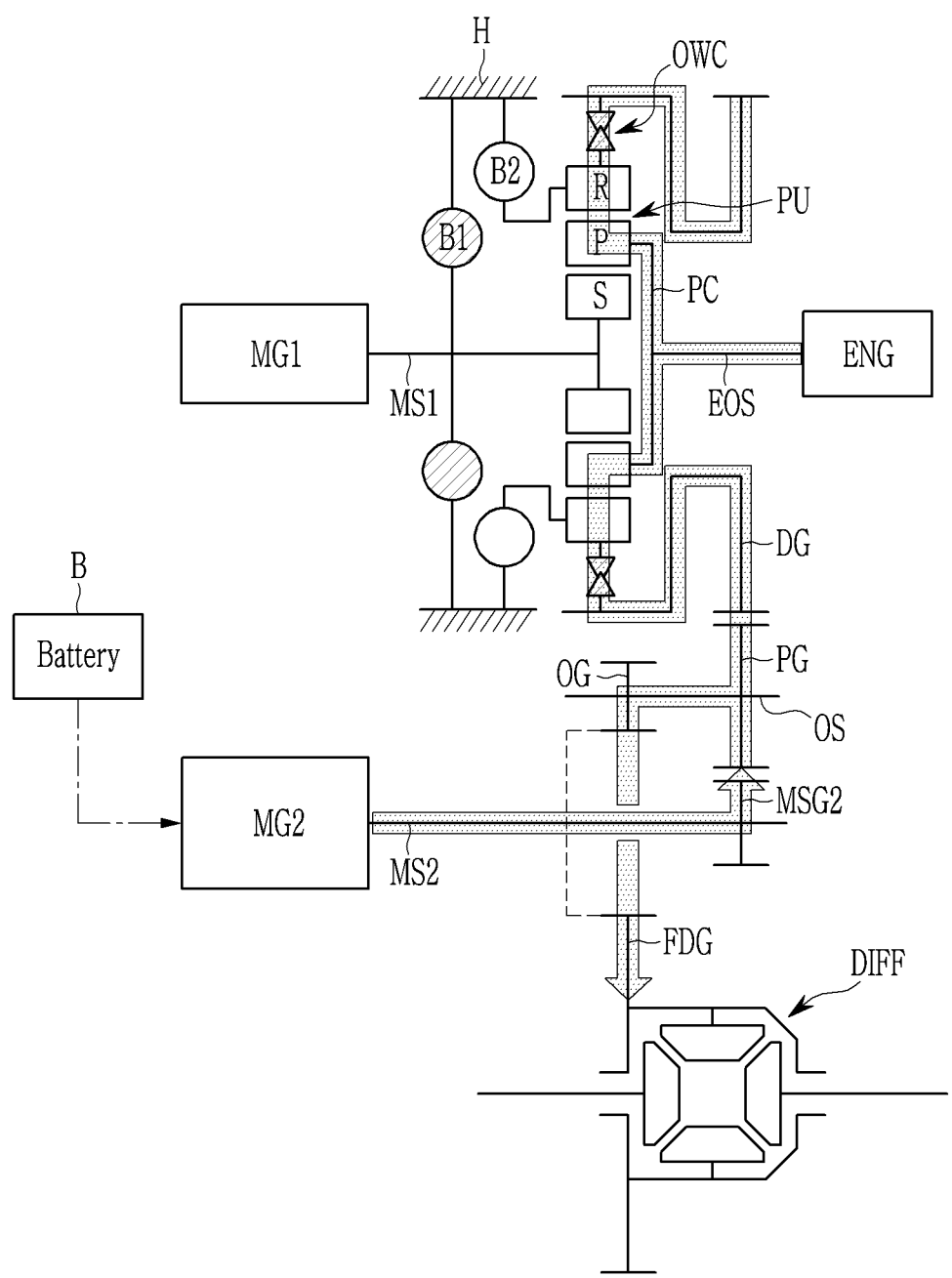

Referring to FIG. 2 and FIG. 6, in HEV PARALLEL mode, the one-way clutch OWC and the first brake B1 operate, and the engine ENG and the second motor-generator MG2 are driven.

Accordingly, in the planetary gear set PU, the sun gear S operates as a fixed element, and the torque of the engine ENG is input to the planet carrier PC of the planetary gear set PU through the engine output shaft EOS, and the speed is increased in the ring gear R of the planetary gear set PU and output through the drive gear DG connected to the one-way clutch OWC.

And the torque of the engine ENG outputted to drive gear DG is combined in the driven gear PG together with torque of the second motor-generator MG2 and transmitted to the differential DIFF through the output shaft OS, the output gear OG, and the final reduction gear FDG, and thus the HEV PARALLEL mode driving is performed.

In the instant case, the driving of the second motor-generator MG2 may be driving for torque assist of the engine ENG.

As described above, the power transmission apparatus of a hybrid vehicle according to various exemplary embodiments of the present invention can improve fuel efficiency by enabling increased speed operation by the engine driving in a high-speed or medium-speed driving range.

In addition, of the present invention an exemplary embodiment of the present invention disposes the one-way clutch OWC for transmitting one direction torque of the ring gear R to the external circumference side of the planetary gear set PU to reduce the overall length and improve the installability.

In addition, of the present invention an exemplary embodiment of the present invention enables power generation by inputting part of the torque of the engine ENG to the first motor-generator MG1 in the HEV E-CVT mode as well as the HEV SERIES mode, increasing energy regeneration efficiency.

In addition, in various exemplary embodiments of the present invention, the torque assist of the second motor-generator MG2 in the HEV PARALLEL mode enables sufficient driving torque to be secured on a climbing road and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In addition, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle that outputs by shifting torque of an engine, a first motor-generator and a second motor-generator, the power transmission apparatus comprising:
    an engine output shaft to which the engine is connected, and the torque of the engine is input;
    a first motor shaft connected to the first motor-generator;
    a second motor shaft connected to the second motor-generator; and
    a second motor shaft gear of the second motor-generator, wherein the second motor shaft gear is fixedly connected to the second motor shaft disposed in parallel with the first motor shaft, and
    a planetary gear set disposed on the first motor shaft and including three rotation elements, wherein among the three rotation elements, one rotation element and the other rotation element are fixedly connected to the engine output shaft and the first motor shaft, respectively, and one remaining rotation element is engaged to the other rotation element, and wherein a drive gear is connected to the remaining rotation element through a one-way clutch;
    an output shaft disposed in parallel between the engine output shaft and the second motor shaft, wherein a driven gear is fixedly mounted on a portion of the output shaft and gear-engaged with the drive gear and the second motor shaft gear, and wherein the output shaft outputs a rotational power transmitted from the planetary gear set and the second motor-generator to a differential engaged to the planetary gear set; and
    a first brake and a second brake,
    wherein the other rotation element is selectively connectable to a transmission housing by the first brake, and
    wherein the remaining rotation element is selectively connectable to the transmission housing by the second brake.

2. The power transmission apparatus of claim 1, wherein the engine output shaft and the first motor shaft are disposed on a same axis.

3. The power transmission apparatus of claim 1,
    wherein the planetary gear set is a single pinion planetary gear set, and
    wherein the single planetary gear set includes:
        a sun gear fixedly connected to the first motor shaft, wherein the sun gear is the other rotation element;
        a planet carrier fixedly connected to the engine output shaft, wherein the planet carrier is the one rotation element; and
        a ring gear engaged to the driving gear through the one-way clutch, wherein the ring gear is the remaining rotation element.

4. The power transmission apparatus of claim 3, further including:
    the first brake and the second brake,
    wherein the sun gear is selectively connectable to the transmission housing by the first brake, and
    wherein the ring gear is selectively connectable to the transmission housing by the second brake.

5. The power transmission apparatus of claim 3, wherein the ring gear transmits unidirectional torque to the drive gear through the one-way clutch.

6. The power transmission apparatus of claim 1, wherein the output shaft is gear-engaged with a final reduction gear of the differential through an output gear fixedly connected to the output shaft.

7. A power transmission apparatus for a vehicle, the power transmission apparatus comprising:
    an engine output shaft to which an engine is connected and through which torque of the engine is input;
    a first motor-generator including a first motor shaft;
    a planetary gear set disposed on the first motor shaft and including three rotation elements, and among the three rotation elements, one rotation element and the other rotation element are fixedly connected to the engine output shaft and the first motor shaft, respectively;
    a second motor-generator including a second motor shaft disposed in parallel with the first motor shaft;
    an output shaft disposed in parallel between the engine output shaft and the second motor shaft, and transmitting torque transmitted from the other rotation element and the second motor shaft to a differential;

a drive gear engaged to the remaining rotation element of the planetary gear set via a one-way clutch;
a second motor shaft gear fixedly connected to the second motor shaft; and
a driven gear fixedly connected to the output shaft and gear-engaged with the drive gear and the second motor shaft gear;
a first brake and a second brake,
wherein the other rotation element is selectively connectable to a transmission housing by the first brake, and
wherein the remaining rotation element is selectively connectable to the transmission housing by the second brake.

8. The power transmission apparatus of claim 7, wherein the engine output shaft and the first motor shaft are disposed on a same axis.

9. The power transmission apparatus of claim 7,
wherein the planetary gear set is a single pinion planetary gear set, and
wherein the single planetary gear set includes:
a sun gear fixedly connected to the first motor shaft, wherein the sun gear is the other rotation element;
a planet carrier fixedly connected to the engine output shaft, wherein the planet carrier is the one rotation element; and
a ring gear engaged to the driving gear through the one-way clutch, wherein the ring gear is the remaining rotation element.

10. The power transmission apparatus of claim 9, further including:
the first brake and the second brake,
wherein the sun gear is selectively connectable to the transmission housing by the first brake, and
wherein the ring gear is selectively connectable to the transmission housing by the second brake.

11. The power transmission apparatus of claim 9, wherein the ring gear transmits unidirectional torque to the drive gear through the one-way clutch.

12. The power transmission apparatus of claim 7, wherein the output shaft is gear-engaged with a final reduction gear of the differential through an output gear fixedly connected to the output shaft.

* * * * *